United States Patent

Laughlin

[11] Patent Number: 5,564,266
[45] Date of Patent: Oct. 15, 1996

[54] GRASS RAKE TONGS

[76] Inventor: Kencil H. Laughlin, 4911 S. Boston Pl., Tulsa, Okla. 74105

[21] Appl. No.: 326,752

[22] Filed: Oct. 20, 1994

Related U.S. Application Data

[63] Continuation of Ser. No. 655,968, Feb. 15, 1991, abandoned.

[51] Int. Cl.⁶ .................................................. A01D 7/00
[52] U.S. Cl. .................................. 56/400.12; 294/50.8
[58] Field of Search ........................... 56/400.12, 400.16, 56/400.18, 400.19; 294/50.8

[56] References Cited

U.S. PATENT DOCUMENTS

| | | | |
|---|---|---|---|
| 1,588,927 | 6/1926 | Willis | 294/50.8 |
| 2,316,168 | 4/1943 | James | D8/13 |
| 2,497,192 | 2/1950 | Thayer, Jr. | D8/13 |
| 2,504,943 | 4/1950 | Zifferer | 56/400.12 |
| 2,836,032 | 5/1958 | Melvin | D8/13 |
| 3,164,945 | 1/1965 | Spencer | 56/400.12 |
| 3,350,866 | 11/1967 | Spencer | 56/400.12 |
| 3,643,410 | 2/1972 | Menning | 56/400.12 |
| 3,688,484 | 9/1972 | Cox | 56/400.12 |
| 4,057,277 | 11/1977 | Burkholder | 56/400.12 X |
| 4,545,189 | 10/1985 | Nelson | 56/400.12 |
| 4,991,386 | 2/1991 | Dirksen | 56/400.12 |
| 5,459,988 | 10/1995 | Glaser | 56/400.12 X |

OTHER PUBLICATIONS

True Temper Catalog, Oct. 5, 1965, page number not listed, rake, located at center of page.

*Primary Examiner*—Terry Lee Melius
*Attorney, Agent, or Firm*—Frank J. Catalano; Scott R. Zingerman

[57] ABSTRACT

Grass rake tongs consist of a pair of rakes each having an array of tines joined to a handle by a ferrule and means such as a pin or bolt disposed through the handles above the ferrules at a point approximately mid-way between the lower end of the tines and the upper end of the handles pivotally connecting the handles for rotation with inside portions of said arrays of tines opposing each other. Preferably, rotation about the pivot extends approximately 180° from a fully opened condition in which the handle of each rake abuts an outer portion of the array of tines of the other rake to a fully closed condition in which an inner surface of each array of tines abuts an inner surface of the other array of tines.

1 Claim, 4 Drawing Sheets

GRASS RAKE TONGS

CROSS-REFERENCE TO RELATED APPLICATIONS

This utility application is a continuation of design application Ser. No. 07/655,968, filed Feb. 15, 1991, now abandoned.

BACKGROUND OF THE INVENTION

This invention relates generally to gardening tools and more particularly concerns rakes used in the gathering and bagging of grass clippings, leaves and the like.

While known grass and leaf rakes are reasonably effective in the collection of grass clippings and leaves, they are relatively clumsy in the bagging of the collected materials. Typically, either a hand or hand-held mechanical device is used in conjunction with a rake held in the other hand to pick up the material to be bagged, making it difficult to manipulate the receptacle into which the materials are to be deposited without dropping some or all of the material held between the rake and the opposing hand or device. This task becomes especially frustrating when the receptacle is one of the common grass and leaf bags which are difficult to maintain in an open condition.

To resolve this problem, a variety of mechanical linkages and attachments have been added to rakes so that the rake can be manipulated with one hand, leaving the other hand free to assist in bagging. However, the complexity of many of these mechanical linkages and attachments makes these rakes comparatively expensive and subject to damage. Worse than this, however, these added attachments result in a number of levers, prongs, springs and the like protruding and extending beyond the normal contour of the rake which cause the rake to become entangled in flowers, shrubs, tree roots, wood and wire fencing and other rake devouring paraphernalia in which grass clippings and leaves tend to collect.

It is, therefore, an object of this invention to provide grass rake tongs which facilitate bagging of collected materials without diminishing the effectiveness of the tongs as a raking or collecting mechanism.

SUMMARY OF THE INVENTION

In accordance with the invention, the grass rake tongs consist of a pair of rakes each having an array of tines joined to a handle by a ferrule and means such as a pin or bolt disposed through the handles above the ferrules at a point approximately mid-way between the lower end of the tines and the upper end of the handles pivotally connecting the handles for rotation with inside portions of said arrays of tines opposing each other. Preferably, rotation about the pivot extends approximately 180° from a fully opened condition in which the handle of each rake abuts an outer portion of the array of tines of the other rake to a fully closed condition in which an inner surface of each array of tines abuts an inner surface of the other array of tines.

Figure 1:
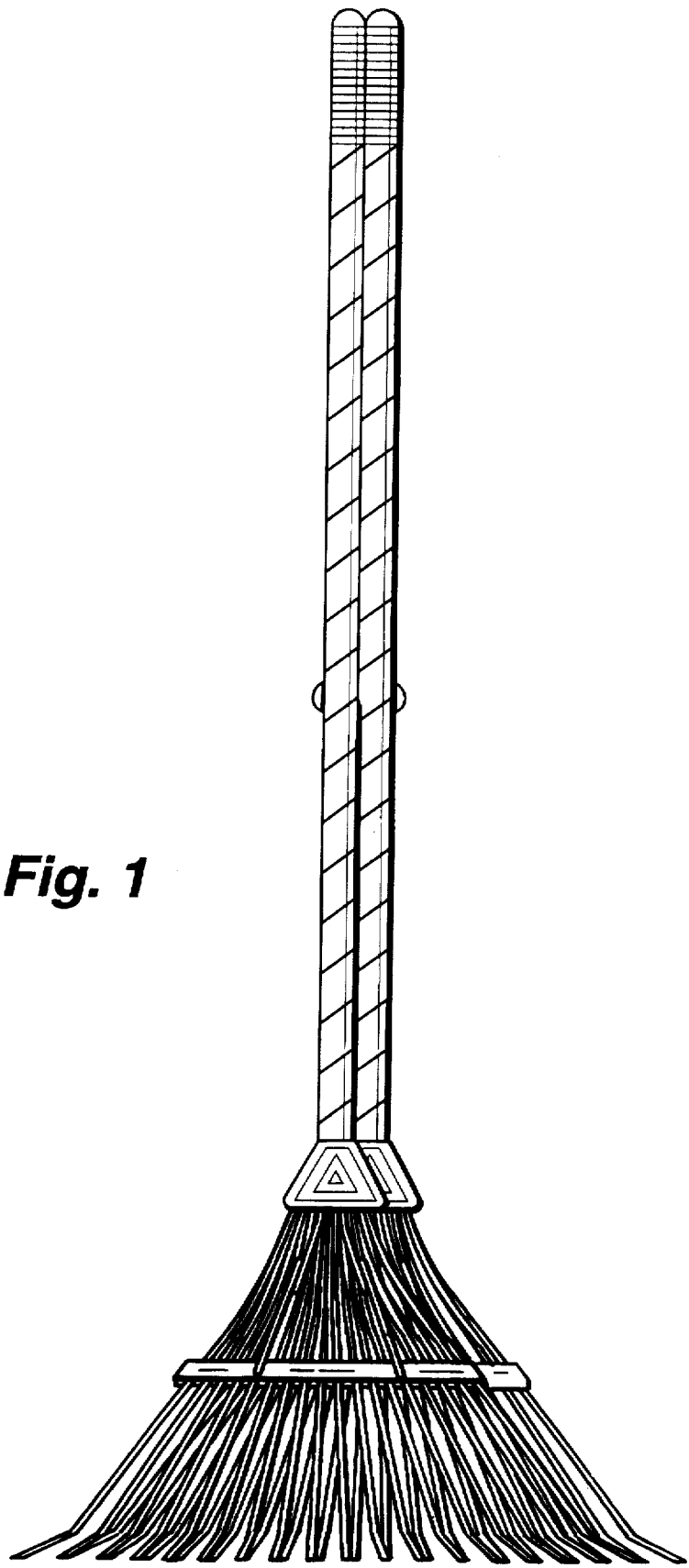
FIG. 1 is a front elevational view of a grass rake tong showing my new design, the rear elevational view being identical thereto.
Figure 2:
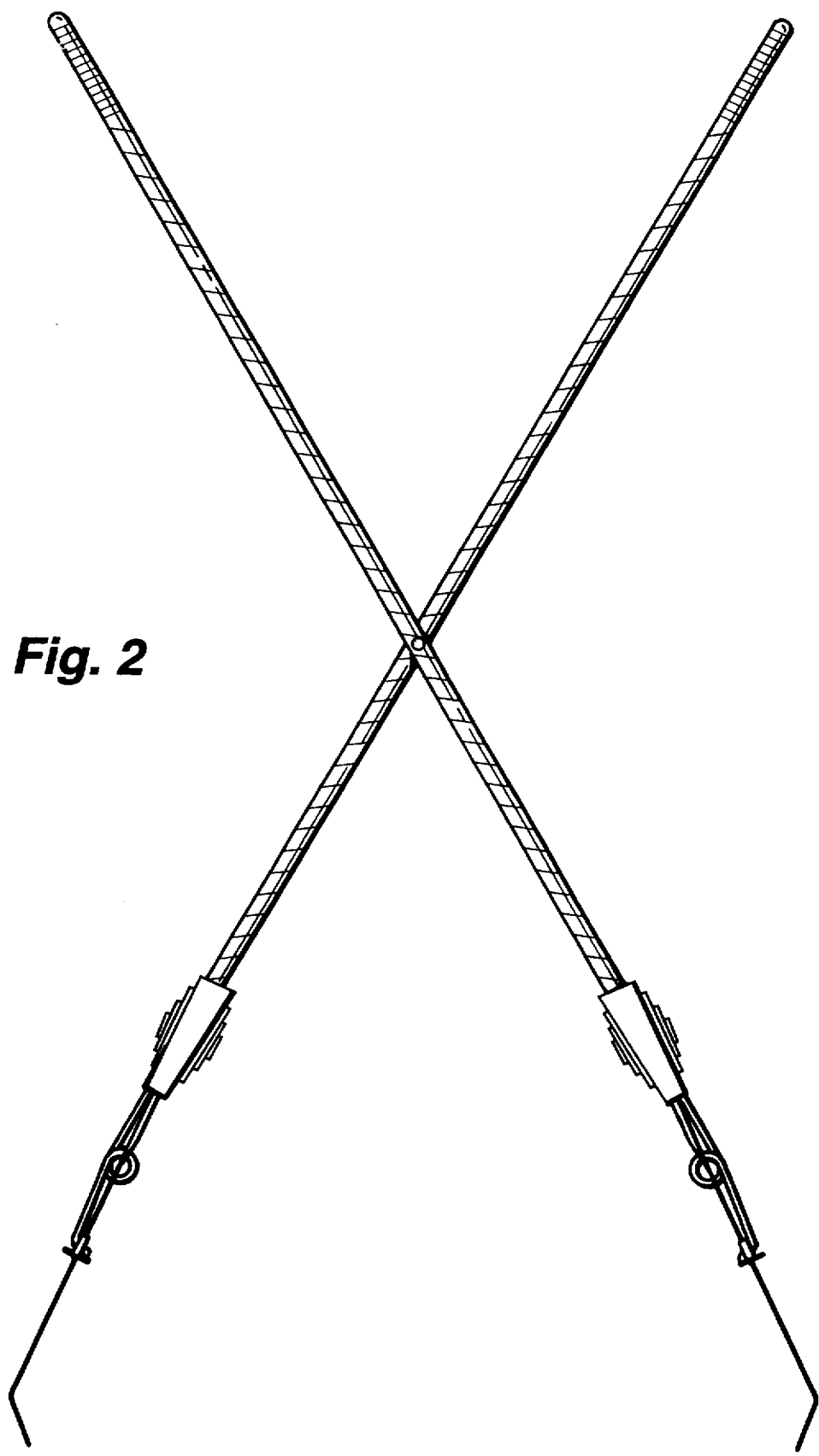
FIG. 2 is a left side elevational view thereof, the right side elevational view being identical thereto.
Figure 4:
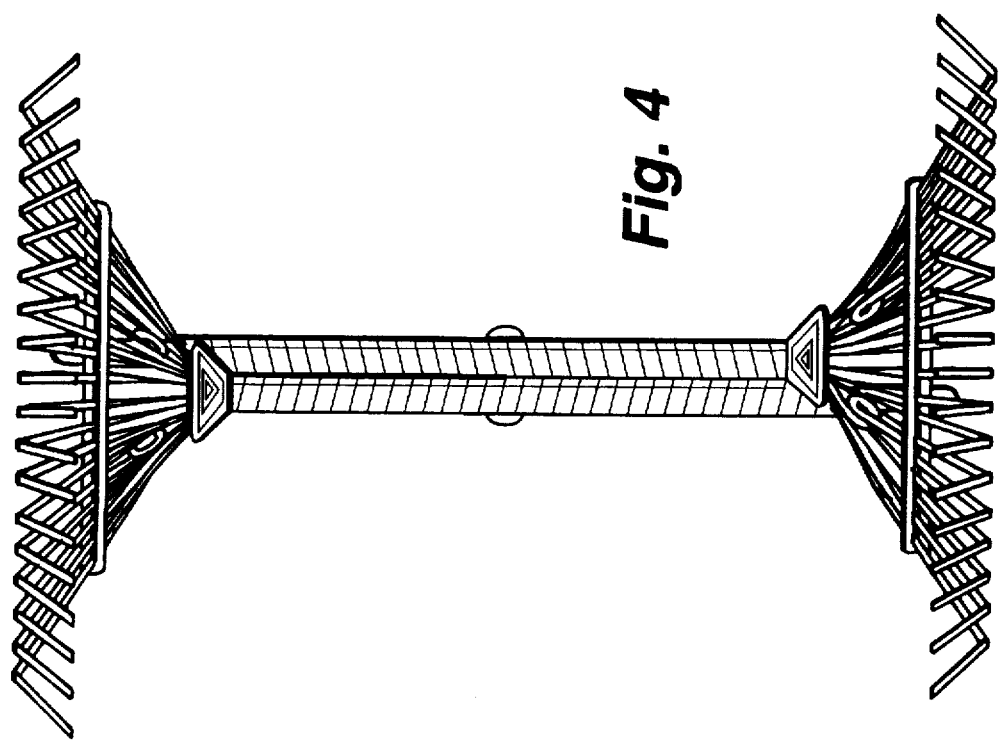
Figure 5:
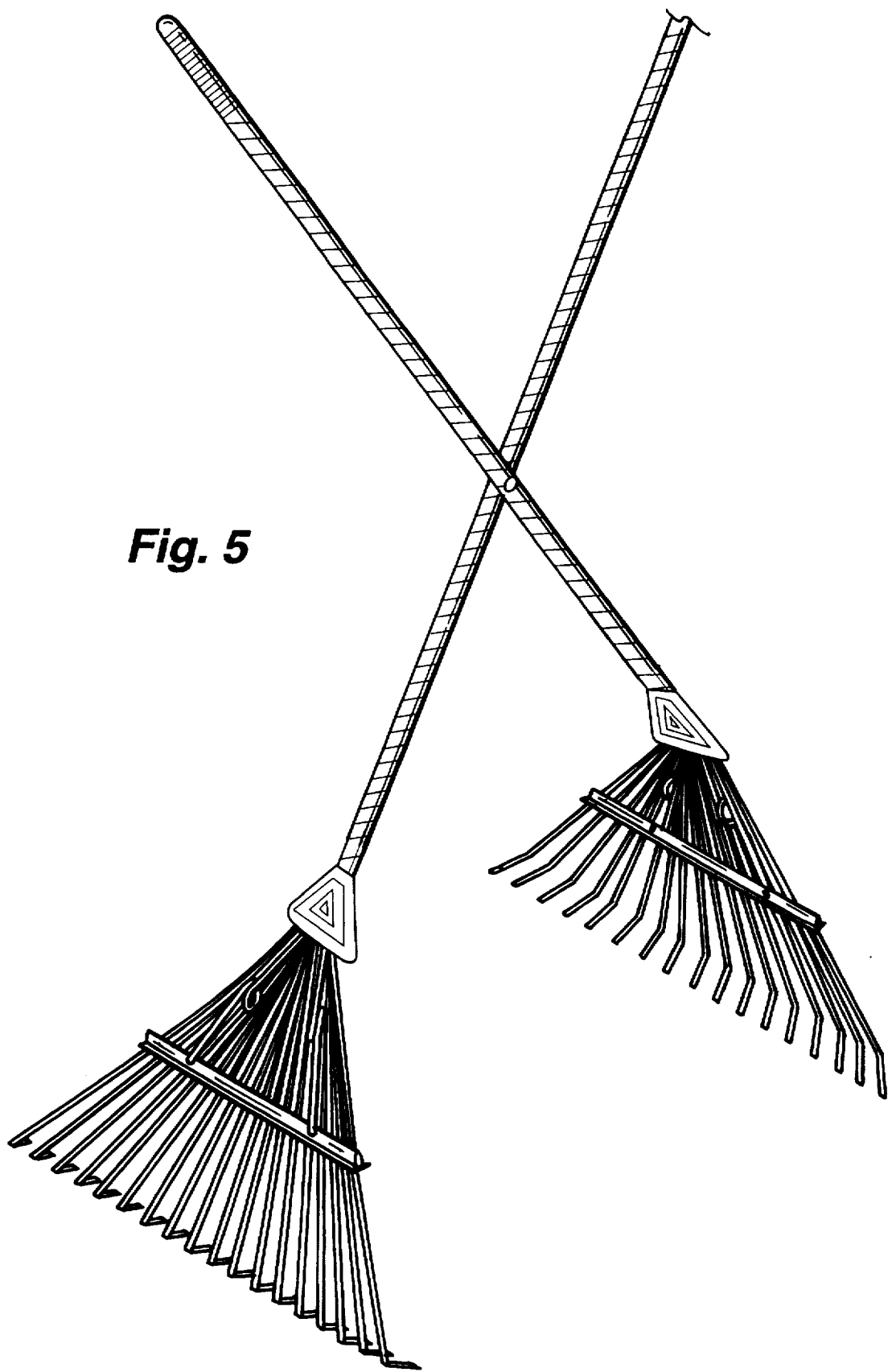

FIG. 4 if a bottom plan view thereof;

FIG. 5 is an isometric projection view thereof.

DETAILED DESCRIPTION OF THE INVENTION

As shown in the drawings, the grass rake tongs consist of two identical grass rakes each consisting of an array of tines 11 connected to a handle 13 by a ferrule 15. The handles 13 are pivotally joined at a point 11 proximate the mid-point between the lower end 19 of the tines 11 and the upper end 21 of the handle 13, for example, by a threaded bolt 23 extending through aligned apertures in the handle to a nut 25 securing the bolt 23 in place. Preferably, a pair of washers will be disposed on the bolt 23 between the handles 13 to facilitate rotation of one handle 13 in relation to the other.

Figure 3:
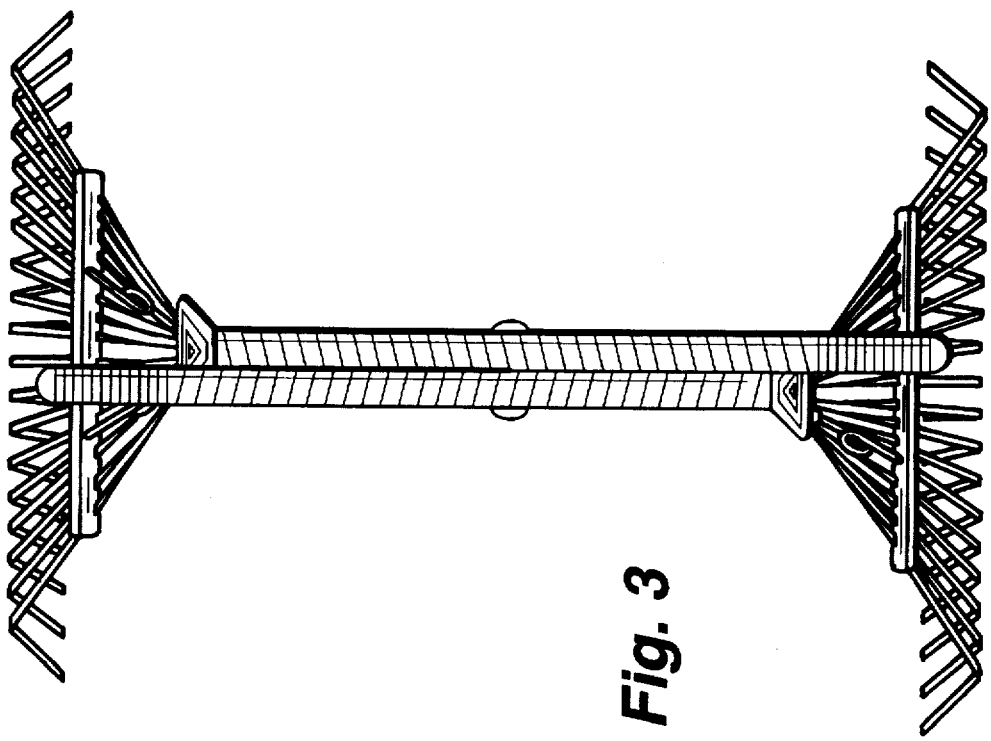
FIG. 3 is a top plan view thereof.

In operation, as can best be seen in FIGS. 5 and 6, with the tongs in the fully open condition, either array of tines 11 can be used for the normal raking action. After raking is completed, the tongs can be closed approximately half way as illustrated in FIGS. 3 and 4 so that the materials to be bagged will fit between the oppositely faced tines 11. The handles 13 can then be manipulated to further close the tongs and compress the material between the tines 11 for lifting so that, with one hand, the materials are secured between the oppositely faced tines 11 for bagging while the other hand is free to manipulate the receptacle into which the materials are to be inserted.

Thus, it is apparent that there has been provided, in accordance with the invention, grass rake tongs that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. Grass rake tongs, comprising:

a pair of rakes each having an array of tines joined in triangular configuration to a lower end of a handle by a ferrule, said triangular configuration of tines of each said array having an apex at said ferrule and a base in a straight line: and means disposed through said handles above said ferrules at a point approximately mid-way between a lower end of said tines and an upper end of said handle pivotally connecting said handles for rotation thereabout with inside portions of said arrays of tines opposing each other, wherein the rotation about said pivot means extends approximately 180° from a fully opened condition in which said handle of each said rake abuts an outer portion of said array of tines of the other said rake and said upper end of each said handle extends substantially to said base of said tines of the other said rake to a fully closed condition in which an inner surface of each of said arrays of tines abuts an inner surface of the other of said arrays of tines.

* * * * *